United States Patent

[11] 3,621,020

| [72] | Inventor | Leo Ojakaar<br>Hockessin, Del. |
|---|---|---|
| [21] | Appl. No. | 886,033 |
| [22] | Filed | Dec. 17, 1969 |
| [45] | Patented | Nov. 16, 1971 |
| [73] | Assignee | E. I. du Pont de Nemours and Company<br>Wilmington, Del.<br>Continuation-in-part of application Ser. No. 676,617, Oct. 19, 1967, now abandoned.<br>This application Dec. 17, 1969, Ser. No. 886,033 |

[54] PROCESS FOR TRIMERIZING POLYISOCYANATES
10 Claims, No Drawings

[52] U.S. Cl. .................................................... 260/248
 NS, 260/77.5 NC, 260/77.5 AC, 260/2.5 AC,
 260/2.5 AW
[51] Int. Cl. ......................................................... C07d 55/38
[50] Field of Search ............................................ 260/248
 NS, 77.5 NC

[56] References Cited
UNITED STATES PATENTS

| 3,144,452 | 8/1964 | Wild et al. ..................... | 260/248 |
| 3,252,942 | 5/1966 | France et al. .................. | 260/77.5 |
| 3,259,625 | 7/1966 | Ugi et al. ....................... | 260/248 |

OTHER REFERENCES

Flynn et al., J. Org. Chem., Vol. 28, pp. 3,527– 3,530, (1963)

*Primary Examiner*—John M. Ford
*Attorney*—Vernon R. Rice

ABSTRACT: A rapid and economical method for trimerizing organic polyisocyanates by mixing an organic polyisocyanate with substituted guanidine and/or isobiguanide catalysts. The catalysts exhibit high activity, usually requiring little or no heat to induce trimerization. The trimerized polyisocyanates are especially useful in the preparation of rigid polyurethane foams.

3,621,020

PROCESS FOR TRIMERIZING POLYISOCYANATES

This application is a continuation-in-part of application Ser. No. 676,617, filed Oct. 19, 1967, now abandoned.

BACKGROUND OF THE INVENTION

It is well known that isocyanate compositions of various types in combination with active hydrogen compounds are useful in the preparation of numerous types of important commercial products, such as polyurethane coatings, elastomers and foams. In order to introduce special effects into these products, it is often necessary to modify the isocyanate composition used prior to reacting it with the active hydrogen compound, e.g., by preparing isocyanato-terminated prepolymers. Another important modification is the reaction of a portion of the isocyanato groups present to form isocyanate trimers (isocyanurates) in the isocyanate composition which is then reacted with such compounds as polyols, polyamines and water to form useful products. Such partially trimerized isocyanate compositions have reduced volatility and toxicity, increased light stability and because of their higher functionality, are especially valuable in preparing tough, highly insoluble polyurethanes.

Many processes are known for trimerizing isocyanates. U.S. Pat. No. 2,978,449 discloses the use of basic catalysts such as sodium hydroxide and potassium acetate; and British Pat. No. 1,001,746 discloses compounds containing ethylene imine rings as catalysts for isocyanurate formation. While these catalysts and others have been somewhat effective in isocyanate trimerization reactions, they in general have not been entirely satisfactory as the reaction rates which they induce are often very slow and many require the presence of cocatalysts or rigorous reaction conditions such as high temperatures, particularly when unreactive isocyanates are being trimerized.

SUMMARY OF THE INVENTION

According to this invention a process is provided for trimerizing organic polyisocyanates by mixing said polyisocyanates with certain substituted guanidines and/or substituted isobiguanides.

DETAILED DESCRIPTION

The organic isocyanates which can be trimerized by the process of this invention include alkyl, cycloalkyl, aralkyl, alkaryl and aryl polyisocyanates. Representative isocyanates are tetramethylene diisocyanate, hexamethylene diisocyanate, xylylene diisocyanate, 2,4-tolylene diisocyanate, 2,6-tolylene diisocyanate, 2,4,6-triisocyanatotoluene, 4,4'-diisocyanatodiphenylmethane, napthalene-1,5-diisocyanate and polymeric polyisocyanates such as those prepared by the phosgenation of polyamines present in crude or undistilled 4,4'-methylene dianiline made by condensing aniline and formaldehyde in the presence of a mineral acid. Mixtures of polyisocyanates can also be trimerized.

The process of this invention is also useful in trimerizing crude or undistilled polyisocyanate mixtures that contain complex, high molecular weight, tarry materials produced by the reaction of phosgene and an organic polyamine. Such phosgenation byproducts are generally considered by those skilled in the art to be comprised largely of biuret and polymeric biuret molecules having free isocyanato groups. These isocyanato groups can participate in trimer formation along with the isocyanato groups of other polyisocyanates present. Successful trimerization of such crude polyisocyanate mixtures is of considerable importance since certain trimerized crude polyisocyanate mixtures are especially valuable in the preparation of polyurethane rigid foams.

The catalysts used in promoting the trimerization reactions of this invention are guanidines of the formula

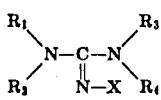

and/or isobiguanides of the formula

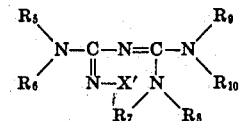

wherein each R group, $R_1$ to $R_{10}$, is independently $C_1-C_4$ alkyl or $C_3-C_6$ cycloalkyl, and X and X' are independently hydrogen, or a carbamoyl radical of the formula:

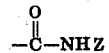

where Z is the monovalent radical remaining after one isocyanato group has been removed from a polyisocyanate as hereinbefore described. Any of the organic groups $R_1$ to $R_{10}$, X, X' and Z can bear one or more of the substituents chloro, bromo or $C_1-C_2$ alkoxy.

The catalysts, described above, in which X and X' are independently carbamoyl radicals can conveniently be formed in situ by the reaction of the quanidine or isobiguanide catalysts which X and X' are hydrogen with the polyisocyanate to be trimerized, or they can be prepared separately by reacting the guanidine or isobiguanides containing the active hydrogen with polyisocyanate.

Representative substituted guanidines and isobiguanides which can readily be prepared in accordance with processes known in the art and which are useful in this invention include 1,1,3,3,-tetramethylguanidine, 1,3-dimethyl-1,3-diethylguanidine, 1,1,4,4,5,5,-hexamethylisobiguanide and 1,1,2,2,3,3,-hexamethyl-4-(phenylcarbamoyl)isobiguanide. Catalyst in which the groups $R_1$ to $R_{10}$ are $C_1-C_4$ alkyl and X and X' are hydrogen are preferred because of their availability and activity. Particularly preferred catalysts are 1,1,3,3,-tetramethylguanidine and 1,1,4,4,5,5-hexamethylisobiquanide. 1,1,3,3-Tetramethylguanidine is readily available and induces rapid but easily controlled trimerization of aromatic isocyanates; 1,1,4,4,5,5-hexamethylisobiguanide is highly active and can be used to trimerize even the unreactive aliphatic isocyanates without heat.

The trimerization process of this invention is carried out by mixing the substituted guanidine or isobiguanide with the polyisocyanate to be trimerized. The catalysts can be used in amounts of from about 0.001-5.0 percent by weight based on the weight of the isocyanate to be trimerized. The exact amount required varies with the polyisocyanate, the catalyst employed, the temperature, and rate and extent of trimerization required. In general for a given catalyst, larger amounts are required when (1) relatively unreactive polyisocyanates such as the aliphatic polyisocyanates are trimerized, (2) lower reaction temperatures are employed, (3) rapid reaction rates and a high degree of trimerization are desired, and (4) crude as opposed to refined polyisocyanates are being trimerized. A generally preferred amount is about 0.05 to 2.0 percent by weight based on the weight of the isocyanate. Catalyst present in such amounts is economically feasible and gives acceptably fast reaction rates.

The substituted guanidine and isobiguanide catalysts are active at temperatures from about −10° to 250° C. At about 250° C. and above, most isocyanates and their trimers have limited stability. A temperature range of about 20°–180° C. is preferred since it provides process conveniences and rapid reaction rates at temperatures at which most polyisocyanates and their trimers are quite stable.

The catalysts described herein can be used alone or in conjunction with cocatalysts such as alkali metal hydroxides and compounds containing ethylene imine rings.

The reaction can be carried out in the presence or absence of an inert solvent. When substantial amounts of the polyisocyanate present is trimerized, the resulting trimer can usually be more conveniently handled if already dissolved in a reaction solvent. If lesser amounts of the trimer are formed, the unreacted polyisocyanate itself can serve as a solvent and additional solvent provides no advantage. By "inert" it is meant that the solvent does not contain ingredients which interfere with the trimerization reaction, e.g., active hydrogen-bearing compounds. The pressure at which the reaction is carried out has no significant effect on the results obtained.

The extend to which trimerization is allowed to proceed can be readily controlled by the addition of acids such as hydrogen chloride and phosphoric acid or acid halides such as phosgene, benzoyl chloride, acetyl chloride and adipyl chloride. Since the reduction in isocyanato groups is substantially equal to the weight of the isocyanurate radicals formed, the extent to which trimerization has occurred can easily be determined by measuring the loss in free isocyanato groups.

The polyisocyanate trimers prepared by the process of this invention have various applications such as components in polyurethane elastomers, adhesives and rigid foams. Trimerized polyisocyanate molecules such as those prepared by the process described herein have increased functionality compared to the monomeric isocyanates which make them especially useful in the preparation of insoluble, tough, dimensionally stable polyurethanes.

This invention provides a rapid, convenient and economical method for trimerizing organic polyisocyanates. The catalysts are of high activity, usually require little or no heat to induce trimerization and do not require the presence of a cocatalyst.

The invention will be further illustrated by the following example wherein parts and percentages are by weight unless otherwise indicated.

EXAMPLE

To 100 parts of a mixture of tolylene diisocyanate isomers (80 percent 2,4-; 20 percent 2,6-) is added 0.06 part of 1,1,3,3-tetramethylguanidine. After standing for 20 hours at about 24° C., the isocyanato group assay of the diisocyanate falls from about 48 percent to 45.2 percent. Upon addition of a second 0.06 part of tetramethylguanidine, the isocyanato group content drops to 42.7 percent over a 7-hour period. At this point trimerization is stopped by the addition of 0.5 part of benzoyl chloride. The product contains a precipitate of trimer which can be dissolved by warming to 50°–60° C. The decrease in isocyanato content corresponds to a conversion of 22 percent of diisocyanate to monomeric trimer.

I claim:
1. A process for trimerizing an organic polyisocyanate consisting essentially of mixing said polyisocyanate with about 0.001 percent to about 5.0 percent by weight of a substituted guanidine of the formula:

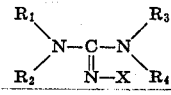

, a substituted isobiguanide of the formula:

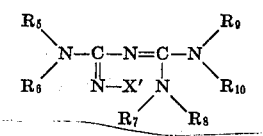

, or mixtures thereof, wherein each R group, $R_1$ through $R_{10}$, is independently $C_1$–$C_4$ alkyl or $C_3$–$C_6$ cycloalkyl; and X and X' are hydrogen.

2. The process of claim 1 wherein the trimerization reaction is carried out at temperatures from about −10° to about 250° C. and the catalyst is present in the amount of about 0.001–5.0 percent based on the weight of the organic polyisocyanate.

3. The process of claim 2 wherein each R group, $R_1$ to $R_{10}$, is independently $C_1$–$C_4$ alkyl, and each of X and X' is hydrogen.

4. The process of claim 3 wherein the catalyst is 1,1,3,3-tetramethylguanidine or 1,1,4,4,5,5-hexamethylisobiguanide.

5. The process of claim 2 wherein the trimerization reaction is carried out at temperatures from about 20° to about 180° C. and the catalyst is used in the amount of about 0.05 percent to about 2.0 percent by weight based on the weight of the organic polyisocyanate.

6. The process of claim 5 wherein each R group, $R_1$ to $R_{10}$ is independently $C_1$–$C_4$ alkyl, and each of X and X' is hydrogen.

7. The process of claim 6 wherein the catalyst is 1,1,3,3-tetramethylquanidine.

8. The process of claim 8 wherein the organic polyisocyanate is tolylene diisocyanate.

9. The process of claim 5, wherein each R group, $R_1$ to $R_{10}$, is independently $C_1$–$C_4$ alkyl.

10. The process of claim 9, wherein each of the groups $R_1$, $R_2$, $R_3$ and $R_4$ is a methyl radical.

* * * * *